(12) United States Patent
Han

(10) Patent No.: US 8,200,272 B2
(45) Date of Patent: Jun. 12, 2012

(54) APPARATUS AND METHOD FOR TRANSMISSION POWER CONTROL OF HOME BASE TRANSCEIVER STATION (BTS)

(75) Inventor: Jeong-Hyun Han, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 592 days.

(21) Appl. No.: 12/329,299

(22) Filed: Dec. 5, 2008

(65) Prior Publication Data

US 2009/0156259 A1    Jun. 18, 2009

(30) Foreign Application Priority Data

Dec. 12, 2007  (KR) ......................... 10-2007-0129307

(51) Int. Cl.
*H04B 17/00* (2006.01)
(52) U.S. Cl. ...................................... 455/522
(58) Field of Classification Search ............... 455/522
See application file for complete search history.

(56) References Cited

U.S. PATENT DOCUMENTS

| | | | | |
|---|---|---|---|---|
| 5,056,109 A | * | 10/1991 | Gilhousen et al. | 370/342 |
| 6,272,354 B1 | * | 8/2001 | Saario | 455/522 |
| 6,574,485 B1 | * | 6/2003 | Salonaho et al. | 455/522 |
| 6,873,857 B1 | * | 3/2005 | Kanemoto et al. | 455/522 |
| 7,471,641 B2 | * | 12/2008 | Moon et al. | 370/252 |
| 7,471,927 B2 | * | 12/2008 | Chen et al. | 455/39 |
| 7,480,517 B2 | * | 1/2009 | Gross et al. | 455/522 |
| 7,616,677 B2 | * | 11/2009 | Koo et al. | 375/141 |
| 7,620,414 B2 | * | 11/2009 | Chang | 455/522 |

FOREIGN PATENT DOCUMENTS

KR    10-2009-0011505 A    2/2009

* cited by examiner

*Primary Examiner* — Kenneth B. Wells
(74) *Attorney, Agent, or Firm* — Jefferson IP Law, LLP

(57) ABSTRACT

An apparatus and method for controlling an output power of a home Base Transceiver Station (BTS) are provided. The method includes, when receiving a location registration message, determining a type of a user that sends the location registration message, determining a maintain power when the user type is a home user and increasing an output power value to be applied to the home BTS by a difference of the powers between the maintain power and a latest avoid interference power when the maintain power is less than or equal to the latest avoid interference power.

13 Claims, 8 Drawing Sheets

APPARATUS AND METHOD FOR TRANSMISSION POWER CONTROL OF HOME BASE TRANSCEIVER STATION (BTS)

PRIORITY

This application claims the benefit under 35 U.S.C. §119(a) of a Korean patent application filed in the Korean Intellectual Property Office on Dec. 12, 2007 and assigned Serial No. 10-2007-0129307, the entire disclosure of which is hereby incorporated by reference.

BACKGROUND OF THE INVENTION

1. Field of the Invention

The present invention relates to a technique for maintaining and operating home Base Transceiver Stations (BTSs). More particularly, the present invention relates to a technique for maintaining and operating home BTSs without particular management by eliminating a burden of manually determining the output power at the home BTS.

2. Description of the Related Art

A conventional Base Station (BS) includes an Element Management System (EMS) for allowing an operator to control the BS.

FIG. 1 depicts an EMS for controlling the output power of a conventional BS. For sake of description, FIG. 1 illustrates BS1 110, BS2 120 and BSn 130.

The output power value of each BS 110, 120, and 130 is manually determined by the EMS of FIG. 1.

To determine the output power value of a given BS through the EMS 100, the operator conducts a field test on a service coverage of the corresponding BS, determines an output power value, and sets the optimal output power value as the output power value of the corresponding BS.

However, when the operator loses control of the BS, it may not be possible to determine the output power value used to set the output power value of the corresponding BS. This problem also applies to a home BS. Accordingly, there is a need for an apparatus and method for controlling the power of a BTS without relying upon an EMS.

SUMMARY OF THE INVENTION

An aspect of the present invention is to address at least the above mentioned problems and/or disadvantages and to provide at least the advantages described below. Accordingly, an aspect of the present invention is to provide an apparatus and a method for controlling an output power of a home Base Transceiver Station (BTS).

Another aspect of the present invention is to provide an apparatus and a method for automatically determining an output power value of a home BTS regardless of the increasing number of home BTSs.

According to an aspect of the present invention, a method for controlling an output of a home BTS is provided. The method includes determining a type of user that sends a location registration message, determining a maintain power when the user type comprises a home user and increasing an output power value of the home BTS by a difference of the powers between the maintain power and a latest avoid interference power when the maintain power is less than or equal to the latest avoid interference power.

According to another aspect of the present invention, an apparatus of a home BTS for controlling an output power is provided. The apparatus includes a communication interface for communicating with other nodes and a power manager for determining a type of user that sends a location registration message, for determining a maintain power when the user type comprises a home user, and for increasing an output power value of the home BTS by a difference of powers between the maintain power and a latest avoid interference power when the maintain power is less than or equal to the latest avoid interference power.

According to yet another aspect of the present invention, a method for controlling transmission power of a Base Transceiver Station (BTS) is provided. The method includes determining a type of user associated with a location registration message, if the type of user comprises a first user, determining a first power level for providing service to the first user, comparing the first power level to a most recent second power level wherein the most recent second power level is set to avoid interference with a second user and, if the first power level is less than or equal to the most recent second power level, setting the transmission power of the BTS to the most recent second power level.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for controlling an output power of a home Base Transceiver Station (BTS).

In the following description of exemplary embodiments of the present invention, user terminals are divided into two types. The first type is a home user terminal that is capable of accessing the home BTS and receiving service. The second type is a foreign user terminal that is not capable of connecting to the home BTS and receiving the service.

Provision of the service coverage area for the home user terminal needs to be ensured. Accordingly, the output power of the BTS must be high enough to provide the home user terminal sufficient service regardless of the home user terminal's position within the service coverage area. In comparison, since there is no need to service the foreign user terminal, the output power of the home BTS should be minimized to keep the foreign user terminal outside the service coverage of the home BTS and to avoid interference to the foreign user terminal.

To determine the output power value, a location registration message transmitted by the user terminal may be utilized.

The transmission of the location registration message is a basic function of the terminal. The location registration message contains information relating to a strength of a BS (including the home BTS) signal received at the terminal.

Herein, although the foreign user terminal does not receive service from the home BTS, the foreign user terminal may send the location registration message including the information of the signal strength to the home BTS.

In an exemplary embodiment of the present invention, the output power value of the home BTS may be automatically determined by use of the signal strength information. Hereinafter, the home user terminal is referred to as a home user and the foreign user terminal is referred to as a foreign user.

Figure 1:
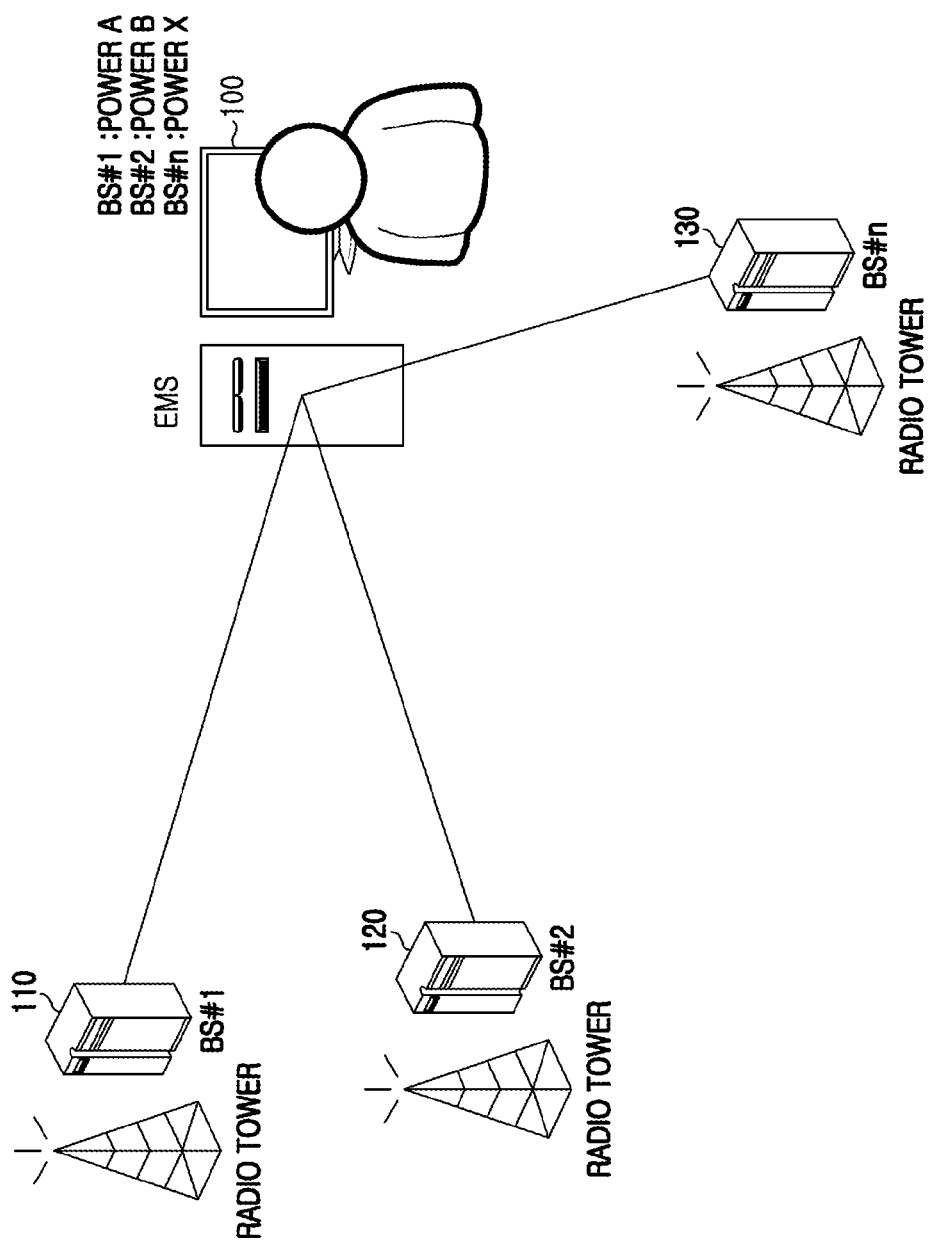
FIG. 1 illustrates an Element Management System (EMS) for controlling an output of a conventional Base Station (BS), and BSs.
Figure 2:
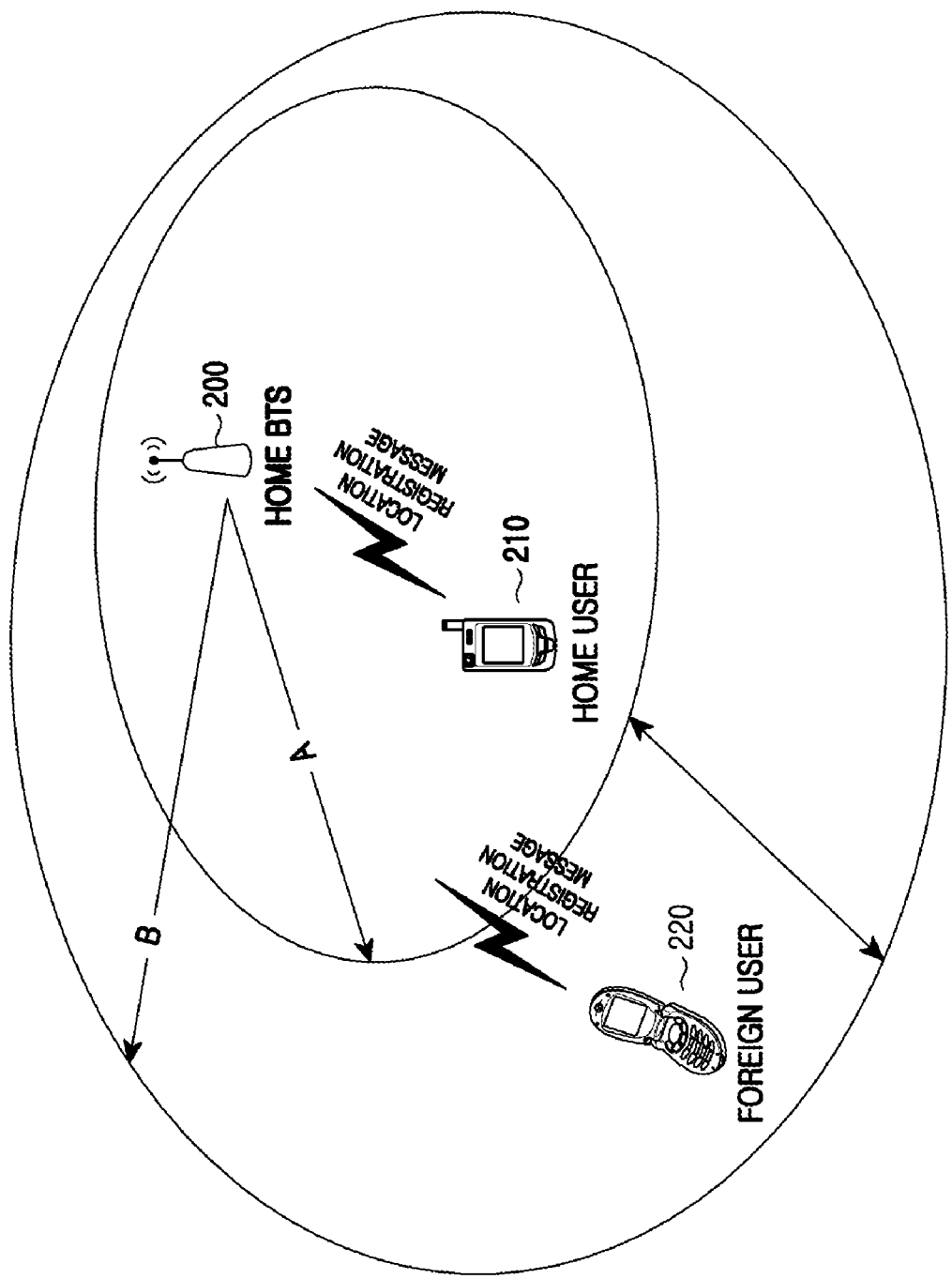
FIG. 2 illustrates control of output power by a home Base Transceiver Station (BTS) based on a home user and a foreign user according to an exemplary embodiment of the present invention.

FIG. 2 illustrates control of output power by a home BTS based on a home user and a foreign user according to an exemplary embodiment of the present invention.

Referring to FIG. 2, for ease of description only, an exemplary system includes a home BTS 200, a home user 210 and a foreign user 220. That is, while only a single home user and a single foreign user are illustrated, this is merely for ease of description and not intended to be limiting and additional home and/or foreign users may be present. In the system of FIG. 2, the home BTS 200 determines a power level that is high enough to provide sufficient service to the home user 210 while low enough to avoid interference with the foreign user 220. More specifically, the home BTS 200 of FIG. 2 determines a maintain power for the home user 210 and an avoid interference power for the foreign user 220 based on location registration messages sent from the home user 210 and the foreign user 220.

The two circles illustrated in FIG. 2 represent areas that may be serviced by the BTS. In a first transmission, the output power of the BTS is set high enough to provide service to both the home user 210 and the foreign user 220. This is represented by the circle closest to the foreign user 220. After the home BS 200 controls the output power, the service coverage area is changed to include only the home user 210. This is represented by the circle closest to the home user 210.

The home BTS 200 does not fix its output power throughout the service coverage. Instead, the home BTS 200 determines the output power by using the output value of the home BTS measured by the terminal and carried by the location registration message of the terminal. As mentioned earlier, the home BTS classifies the users into the home user and the foreign user.

The home BTS receives the location registration message from the home user and determines the maintain power A using the output power value of the home BTS measured by the home user and carried in the location registration message.

The home BTS receives the location registration message from the foreign user and determines the avoid interference power B using the output power value of the home BTS measured by the foreign user and carried in the location registration message.

Figure 3:
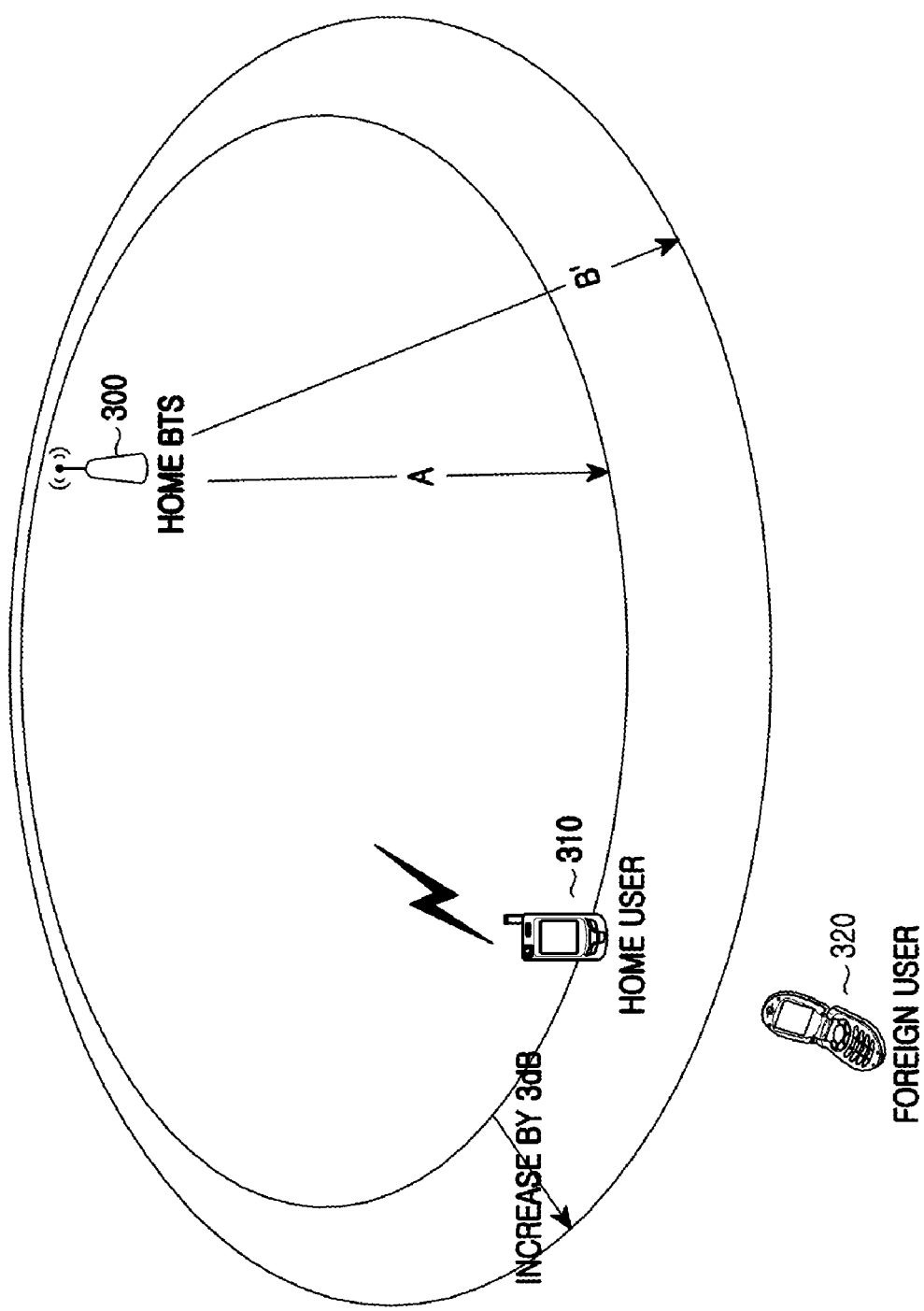
FIG. 3 illustrates operations of a home BTS in a case where a home user sends a location registration message according to an exemplary embodiment of the present invention.

FIG. 3 illustrates operations of a home BTS in a case where a home user sends a location registration message according to an exemplary embodiment of the present invention.

Referring to FIG. 3, an exemplary system includes a home BTS 300, a home user 310 and a foreign user 320. That is, while only a single home user and a single foreign user are illustrated, this is merely for ease of description and not intended to be limiting and additional home and/or foreign users may be present. When the home user 310 sends a location registration message, the home BTS 300 determines a maintain power A and compares the determined maintain power A with the latest avoid interference power B'.

When the maintain power A is less than or equal to the avoid interference power B' (A≦B'), the output power of the home BTS 300 may be increased by the power difference. In the example illustrated in FIG. 3, it is determined that the power difference is 3 dB so that the output power of the BTS 300 is increased by 3 dB. However, it is to be understood that when the difference is not 3 dB but other various values, the output power is increased by the determined difference.

Figure 4:
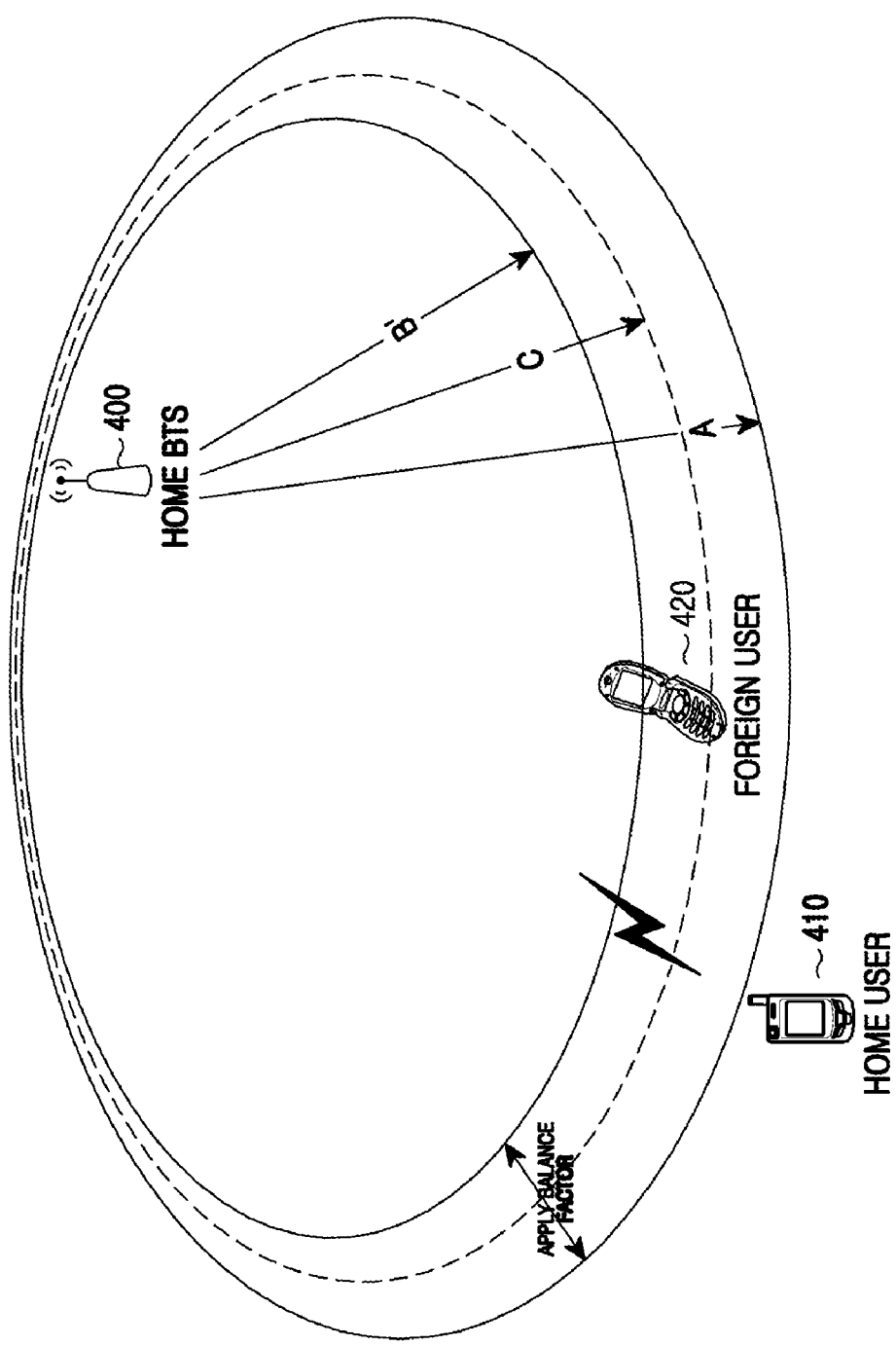
FIG. 4 illustrates operations of a home BTS in a case where a home user sends a location registration message according to an exemplary embodiment of the present invention.

FIG. 4 illustrates operations of a home BTS in a case where a home user sends a location registration message according to an exemplary embodiment of the present invention. In FIG. 4, it is assumed that a home BTS receives the location registration message from the home user, which is further away from the home BTS than is the foreign user, owing to the fluctuation of a wireless environment.

Referring to FIG. 4, an exemplary system includes a home BTS 400, a home user 410 and a foreign user 420. That is, while only a single home user and a single foreign user are illustrated, this is merely for ease of description and not intended to be limiting and additional home and/or foreign users may be present. When the home user 410 sends a location registration message, the home BTS 400 determines the maintain power A and compares the determined maintain power A with the latest avoid interference power B' and determines a current output C of the home BTS 400.

When the maintain power A is greater than the avoid interference power B' (A>B'), the home BTS 400 determines and applies an output value C using a balance factor. The output value C is determined using a balance factor based on Equation (1).

$$C = 10 \times \log_{10}(A'' \times \alpha + B''(1-\alpha)) \quad (1)$$

In Equation (1), α denotes the balance factor, which is arbitrarily determined by the operator. $A'' = 10^{(A/10)}$ and $B'' = 10^{(B/10)}$. B' is regarded as B, C denotes the output value of the home BTS, A denotes the maintain power, and B' denotes the latest avoid interference power.

Figure 5:
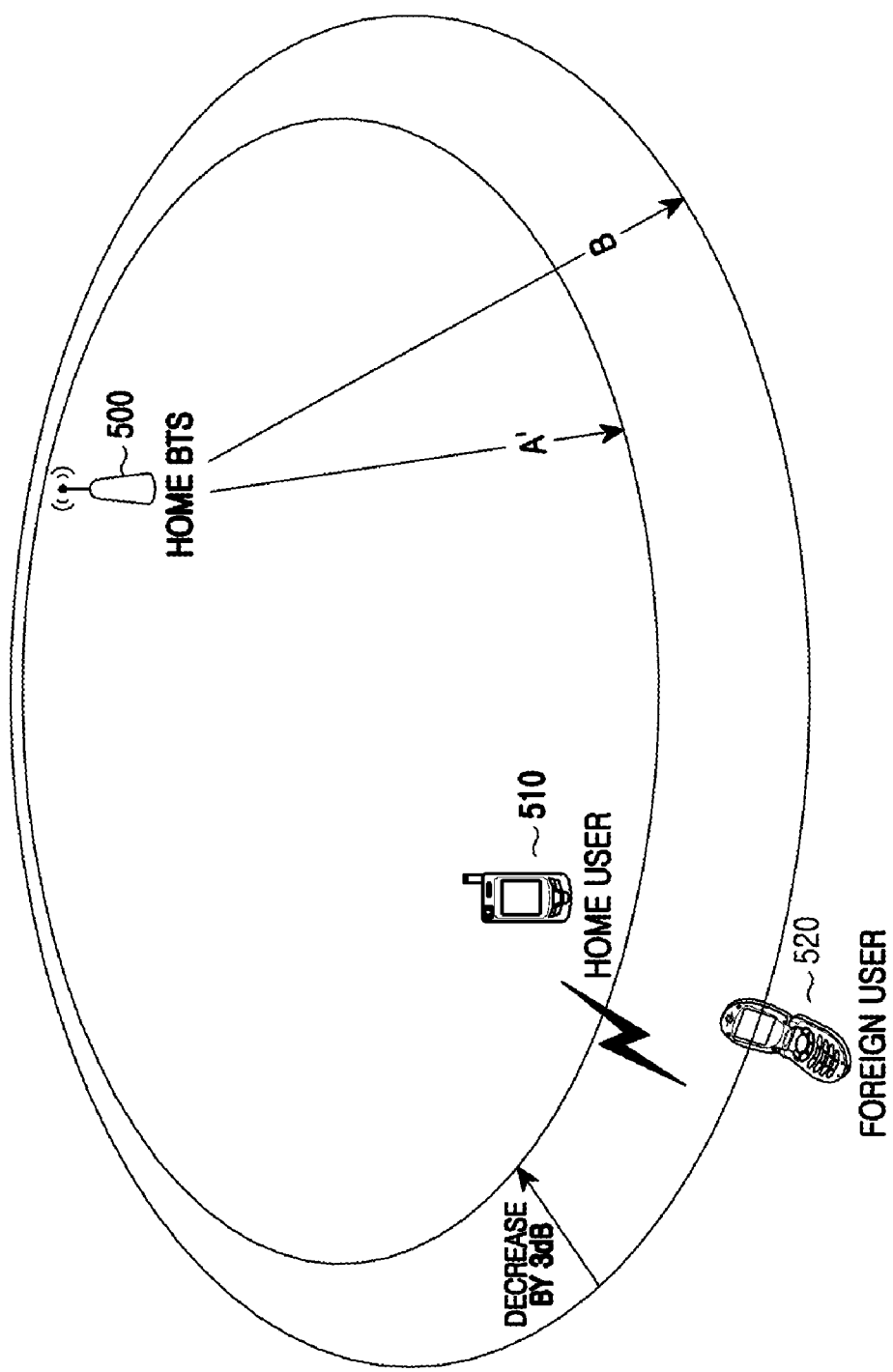
FIG. 5 illustrates operations of a home BTS in a case where a foreign user sends a location registration message according to an exemplary embodiment of the present invention.

FIG. 5 illustrates operations of a home BTS in a case where a foreign user sends a location registration message according to an exemplary embodiment of the present invention.

Referring to FIG. 5, an exemplary system includes a home BTS 500, a home user 510 and a foreign user 520. That is, while only a single home user and a single foreign user are illustrated, this is merely for ease of description and not intended to be limiting and additional home and/or foreign users may be present. When the foreign user 520 sends the location registration message, the home BTS 500 determines the avoid interference power B and compares the determined avoid interference power B with the latest maintain power A'.

When the maintain power A' is less than or equal to the avoid interference power B (A'≦B), the home BTS decreases its output power. In the example illustrated in FIG. 5, it is assumed that the power difference is determined to be 3 dB. Accordingly, the home BTS 500 decreases it output by 3 dB which is the power difference as illustrated in FIG. 5.

Of course, it is to be understood that the output power difference of 3 dB is merely for example and that the power difference may be other values. When the difference is not 3 dB but is another value, the output power is decreased by the determined difference.

Figure 6:
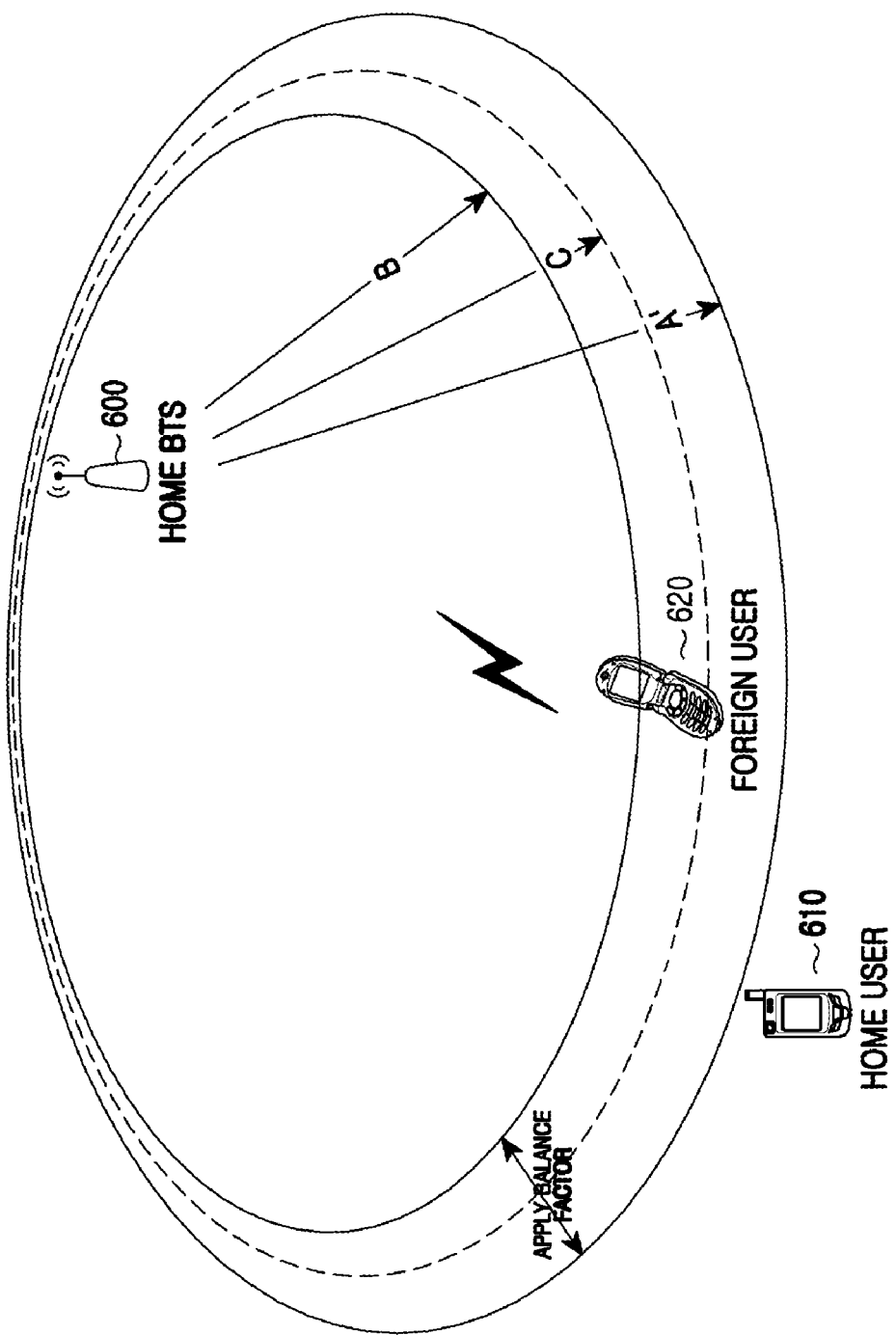
FIG. 6 illustrates operations of a home BTS in a case where a foreign user sends a location registration message according to an exemplary embodiment of the present invention.

FIG. 6 illustrates operations of a home BTS in a case where a foreign user sends a location registration message according to an exemplary embodiment of the present invention. In FIG. 6, it is assumed that the foreign user migrates toward the home BTS.

When the foreign user 620 sends the location registration message, the home BTS 600 determines the avoid interference power B and compares the determined avoid interference power B with the latest maintain power A'.

When the maintain power A' is greater than the avoid interference power B (A'>B), the home BTS 600 determines and applies the output power value C using a balance factor. The output power value C is determined using the balance factor based on Equation (2).

$$C = 10 \times \log_{10}(A'' \times \alpha + B''(1-\alpha)) \quad (2)$$

In Equation (2), α denotes the balance factor, which is arbitrarily determined by the operator. $A''=10^{(A/10)}$ and $B''=10^{(B/10)}$. A' is regarded as A, C denotes the output power value of the home BTS, A' denotes the latest maintain power determined, and B denotes the avoid interference power.

Figure 7:
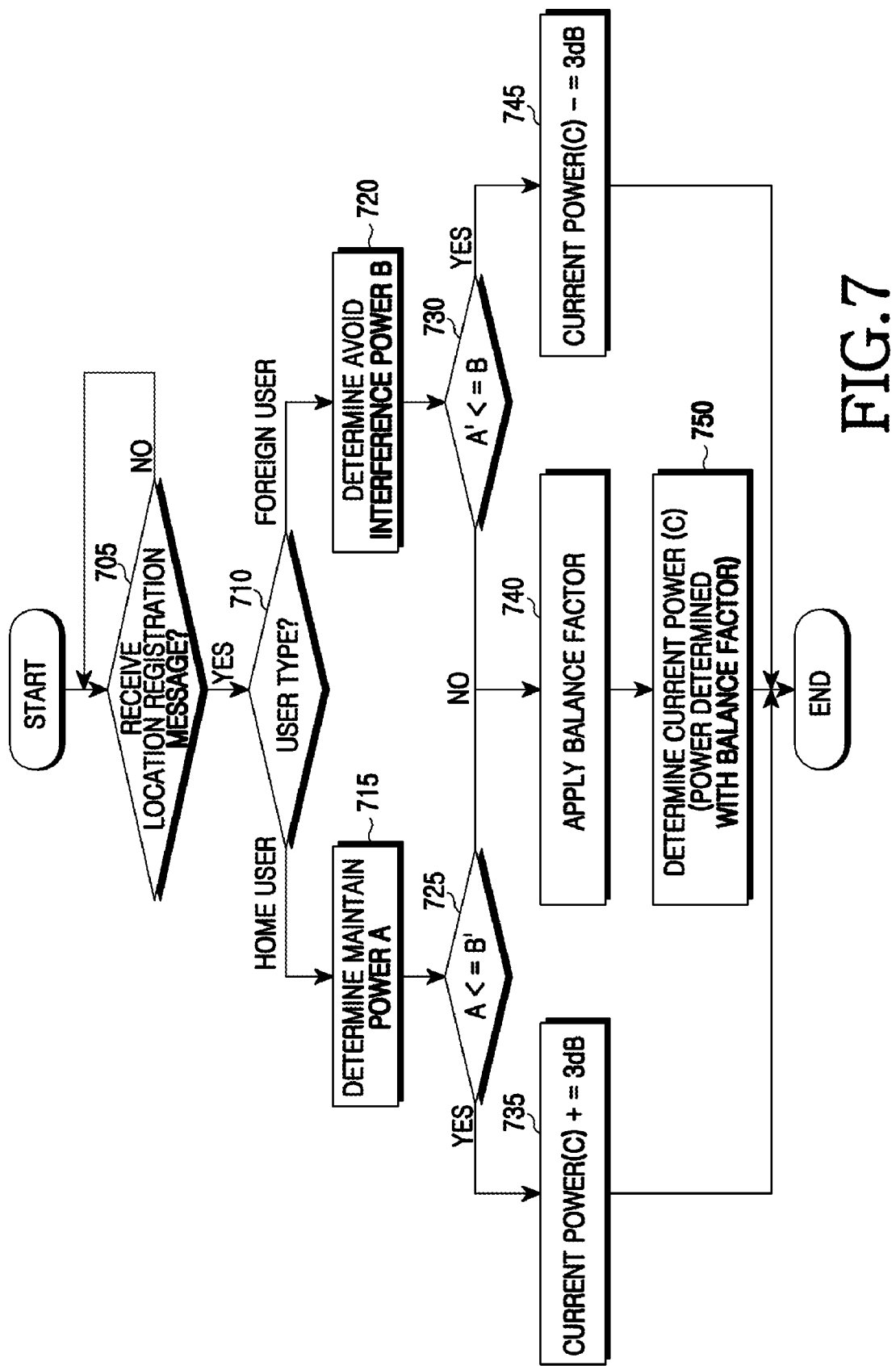
FIG. 7 illustrates a method for determining an output value of a home BTS according to an exemplary embodiment of the present invention.

FIG. 7 illustrates a method for determining the output power value of a home BTS according to an exemplary embodiment of the present invention.

Referring to FIG. 7, it is determined if a location registration message is received in step 705. If it is determined that the location registration message is received in step 705, the home BTS determines the type of user that sent the location registration message in step 710.

When it is determined that the user type is a home user, the home BTS determines the maintain power A in step 715.

In step 725, it is determined if the maintain power A is less than or equal to the latest avoid interference power B'. When it is determined that the maintain power A is less than or equal to the latest avoid interference power B' in step 725, the home BTS increases the current power by the power difference (e.g., 3 dB) in step 735.

When it is determined that the maintain power A is greater than the latest avoid interference power B' in step 725, the home BTS applies the balance factor in step 740 and determines the power to be applied in step 750. In an exemplary implementation, the power is determined based on Equation (1).

Referring again to step 710, when it is determined that the user type is a foreign user, the home BTS determines the avoid interference power B in step 720.

In step 730, it is determined if the avoid interference power B is greater than or equal to the latest maintain power A', that is, if A' is less than or equal to B. When it is determined that the avoid interference power B is greater than or equal to the latest maintain power A' in step 730, the home BTS decreases the current power by the power difference (e.g., 3 dB) in step 745.

When it is determined that the avoid interference power B is less than the latest maintain power A' in step 730, the home BTS applies the balance factor in step 740 and determines the power to be applied in step 750. In an exemplary implementation, the power is determined based on Equation (2).

Figure 8:
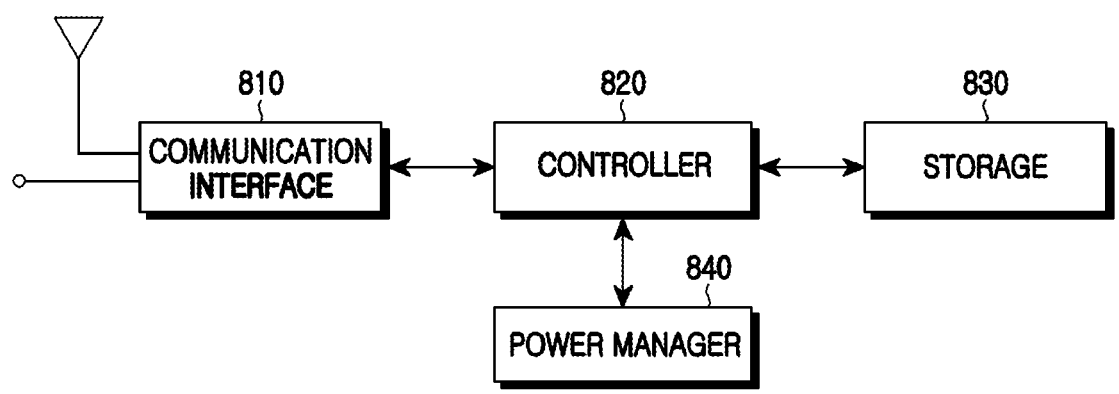
FIG. 8 illustrates a home BTS according to an exemplary embodiment of the present invention.

FIG. 8 is a block diagram of a home BTS according to an exemplary embodiment of the present invention.

Referring to FIG. 8, the home BTS of FIG. 8 includes a communication interface 810, a controller 820, a storage 830 and a power manager 840.

The communication interface 810 is a module for communicating with other nodes. In an exemplary implementation, the communication interface 810 includes a wireless processor, a wireless baseband processor, a wired processor and a wired baseband processor.

The wireless processor converts a signal received via an antenna into a baseband signal and provides the baseband signal to the baseband processor. Also, the wireless processor converts a baseband signal output from the baseband processor into a radio signal transmittable over the air and transmits the signal over the antenna.

The wired processor converts a signal received in a wired path into a baseband signal and provides the baseband signal to the baseband processor. Also, the wired processor converts a baseband signal output from the baseband processor into a wired signal transmittable in the wired path and transmits the signal in the wired path.

The controller 820 controls the operations of the home BTS. More particularly, the controller 820 controls the power manager 840.

The storage 830 stores a program for controlling the operations of the apparatus and also stores temporary data generated in the program execution.

Upon receiving the location registration message through the communication interface 810, the power manager 840 determines the type of user that transmitted the location registration message. When it is determined that the user type is the home user, the power manager 840 determines the maintain power A. When the maintain power A is less than or equal to the latest avoid interference power B', the power manager 840 increases the current power by the difference of the powers. When the maintain power A is greater than the latest avoid interference power B', the power manager 840 determines the power to be applied to the home BTS using the balance factor based on Equation (1).

Alternatively, when it is determined that the user type is the foreign user, the power manager 840 determines the avoid interference power B. When the avoid interference power B is greater than or equal to the latest maintain power A', the power manager 840 decreases the current power by the difference of the powers. When the avoid interference power B is less than the latest maintain power A', the power manager 840 determines the power to be applied to the home BTS using the balance factor based on Equation (2).

In an exemplary implementation, the controller 820 may function as the power manager 840. Herein, the controller 820 and the power manager 840 are illustrated as separate components to distinguish their functions.

In the actual implementation, the controller 820 may process all or part of the functions of the power manager 840.

Since the home BTS automatically determines its output, the burden of the operator may be reduced by not having to manually determine the output of each individual BTS. Accordingly, there may be no need to conduct the field test to acquire the value for each BTS.

Upon every reception of the location registration message from the terminal, the home BTS may change the output value. Therefore, the home user registered to the home BTS may block the foreign user from using the resource of the home BTS, thereby enhancing the service quality as well as saving output power and its associated costs.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling an output of a home Base Transceiver Station (BTS), the method comprising:
    determining a type of user that sends a location registration message;
    determining a maintain power when the user type comprises a home user; and
    increasing an output power value of the home BTS by a difference of the powers between the maintain power and a latest avoid interference power when the maintain power is less than or equal to the latest avoid interference power.

2. The method of claim 1, further comprising:
    determining the output power value of the home BTS using the following equation when the maintain power is greater than the latest avoid interference power:

$$C=10\times\log_{10}(A''\times\alpha+B''(1-\alpha))$$

where $\alpha$ denotes a balance factor that is arbitrarily determined by an operator, $A''=10^{(A/10)}$, $B''=10^{(B/10)}$, B' is regarded as B, C denotes the output value of the home BTS, A denotes the maintain power and B' denotes the latest avoid interference power.

3. The method of claim 1, further comprising:
    determining an avoid interference power when the user type comprises a foreign user; and
    decreasing the output power value of the home BTS by a difference of the powers between the avoid interference power and a latest maintain power when the avoid interference power is greater than or equal to the latest maintain power.

4. The method of claim 3, further comprising:
    determining the output power value of the home BTS using the following equation when the avoid interference power is less than the latest maintain power:

$$C=10\times\log_{10}(A''\times\alpha+B''(1-\alpha))$$

where $\alpha$ denotes a balance factor that is arbitrarily determined by the operator, $A''=10^{(A/10)}$, $B''=10^{(B/10)}$, A' is regarded as A, C denotes the output power value of the home BTS, A' denotes the latest maintain power and B denotes the avoid interference power.

5. An apparatus of a home Base Transceiver Station (BTS) for controlling an output, the apparatus comprising:
    a communication interface for communicating with other nodes; and
    a power manager for determining a type of user that sends a location registration message, for determining a maintain power when the user type comprises a home user and for increasing an output power value of the home BTS by a difference of powers between the maintain power and a latest avoid interference power when the maintain power is less than or equal to the latest avoid interference power.

6. The apparatus of claim 5, wherein the power manager determines the output power value of the home BTS based on the following equation when the maintain power is greater than the latest avoid interference power:

$$C=10\times\log_{10}(A''\times\alpha+B''(1-\alpha))$$

where $\alpha$ denotes a balance factor that is arbitrarily determined by an operator, $A''=10^{(A/10)}$, $B''=10^{(B/10)}$, B' is regarded as B, C denotes the output power value of the home BTS, A denotes the maintain power and B' denotes the latest avoid interference power.

7. The apparatus of claim 5, wherein the power manager determines an avoid interference power when the user type comprises a foreign user, and decreases the output power value of the home BTS by a difference of the powers between the avoid interference power and a latest maintain power when the avoid interference power is greater than or equal to the latest maintain power.

8. The apparatus of claim 7, wherein the power manager determines the output power value of the home BTS based on the following equation when the avoid interference power is less than the latest maintain power:

$$C=10\times\log_{10}(A''\times\alpha+B''(1-\alpha))$$

where $\alpha$ denotes a balance factor, which is arbitrarily determined by the operator, $A''=10^{(A/10)}$, $B''=10^{(B/10)}$, A' is regarded as A, C denotes the output power value of the home BTS, A' denotes the latest maintain power and B denotes the avoid interference power.

9. A method for controlling transmission power of a Base Transceiver Station (BTS), the method comprising:
    determining a type of user associated with a location registration message;
    if the type of user comprises a first user, determining a first power level for providing service to the first user;
    comparing the first power level to a most recent second power level wherein the most recent second power level is set to avoid interference with a second user; and
    if the first power level is less than or equal to the most recent second power level, setting the transmission power of the BTS to the most recent second power level.

10. The method of claim 9, further comprising receiving the location registration message by the BTS.

11. The method of claim 9, further comprising:
    if the first power level is greater than the most recent second power level, setting the transmission power of the BTS to a level determined by:

$$C=10\times\log_{10}(A''\times\alpha+B''(1-\alpha))$$

where $\alpha$ denotes a balance factor, which is arbitrarily determined by an operator, $A''=10^{(A/10)}$, $B''=10^{(B/10)}$, B' is regarded as B, C denotes the transmission power of the BTS, A denotes the first power level and B' denotes the most recent second power level.

12. The method of claim 9, further comprising:
    if the type of user comprises the second user, determining a second power level for avoiding interference with the second user;
    comparing the second power level to a most recent first power level wherein the most recent first power level is set to provide service to the first user; and
    if the second power level is greater than or equal to the most recent first power level, setting the transmission power of the BTS to the most recent first power level.

13. The method of claim 12, further comprising:
    if the second power level is less than the most recent first power level, setting the transmission power of the BTS to a level determined by:

$$C=10\times\log_{10}(A''\times\alpha+B''(1-\alpha))$$

where $\alpha$ denotes a balance factor that is arbitrarily determined by an operator, $A''=10^{(A/10)}$, $B''=10^{(B/10)}$, A' is regarded as A, C denotes the transmission power of the BTS, A' denotes the most recent first power level and B denotes the second power level.

* * * * *